A. W. LOSHBOUGH.
CHART FOR COMPUTING SCALES.
APPLICATION FILED SEPT. 14, 1910.
1,028,946.
Patented June 11, 1912.
3 SHEETS—SHEET 1.
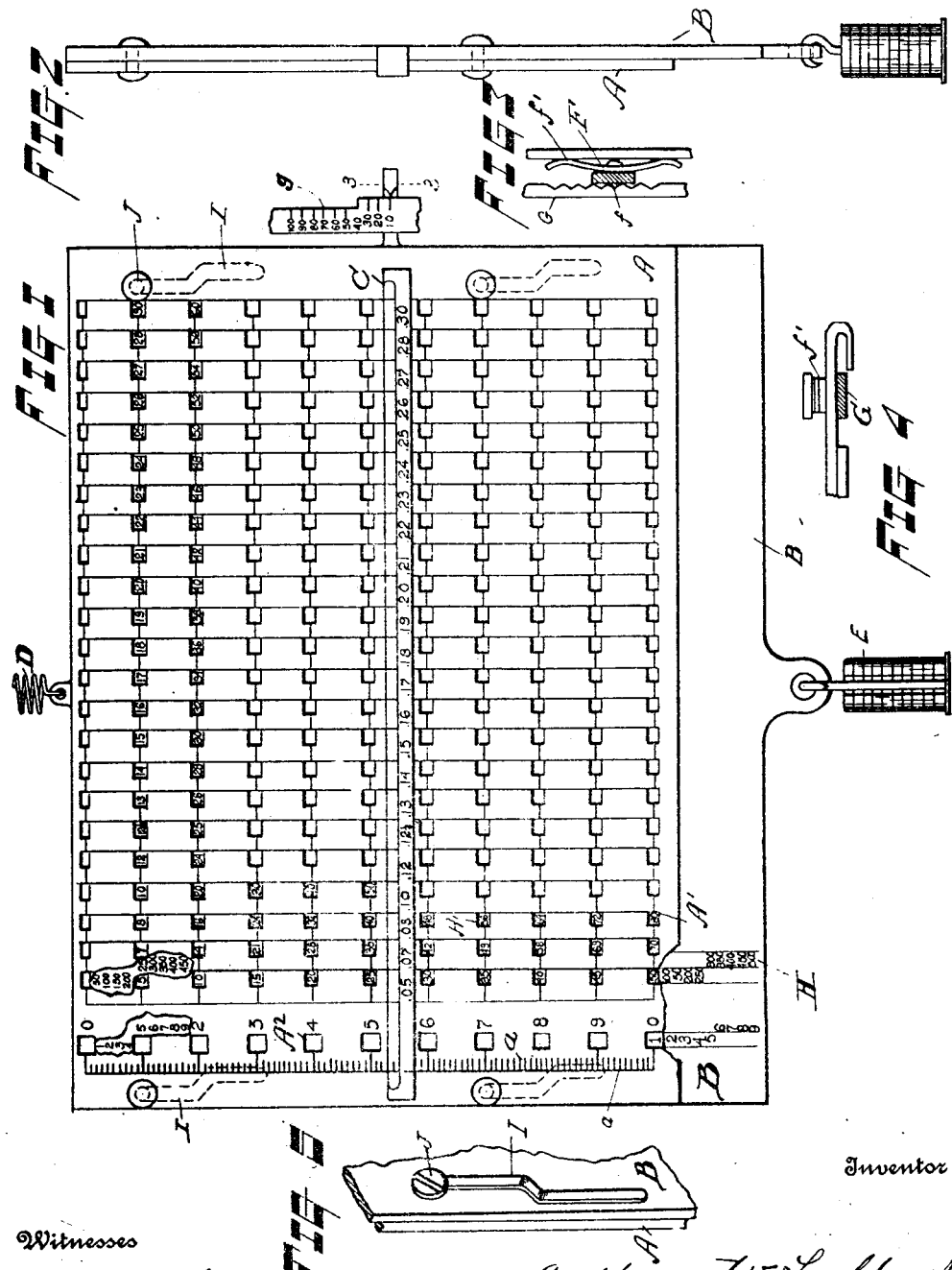

A. W. LOSHBOUGH.
CHART FOR COMPUTING SCALES.
APPLICATION FILED SEPT. 14, 1910.
1,028,946.
Patented June 11, 1912.
3 SHEETS—SHEET 2.
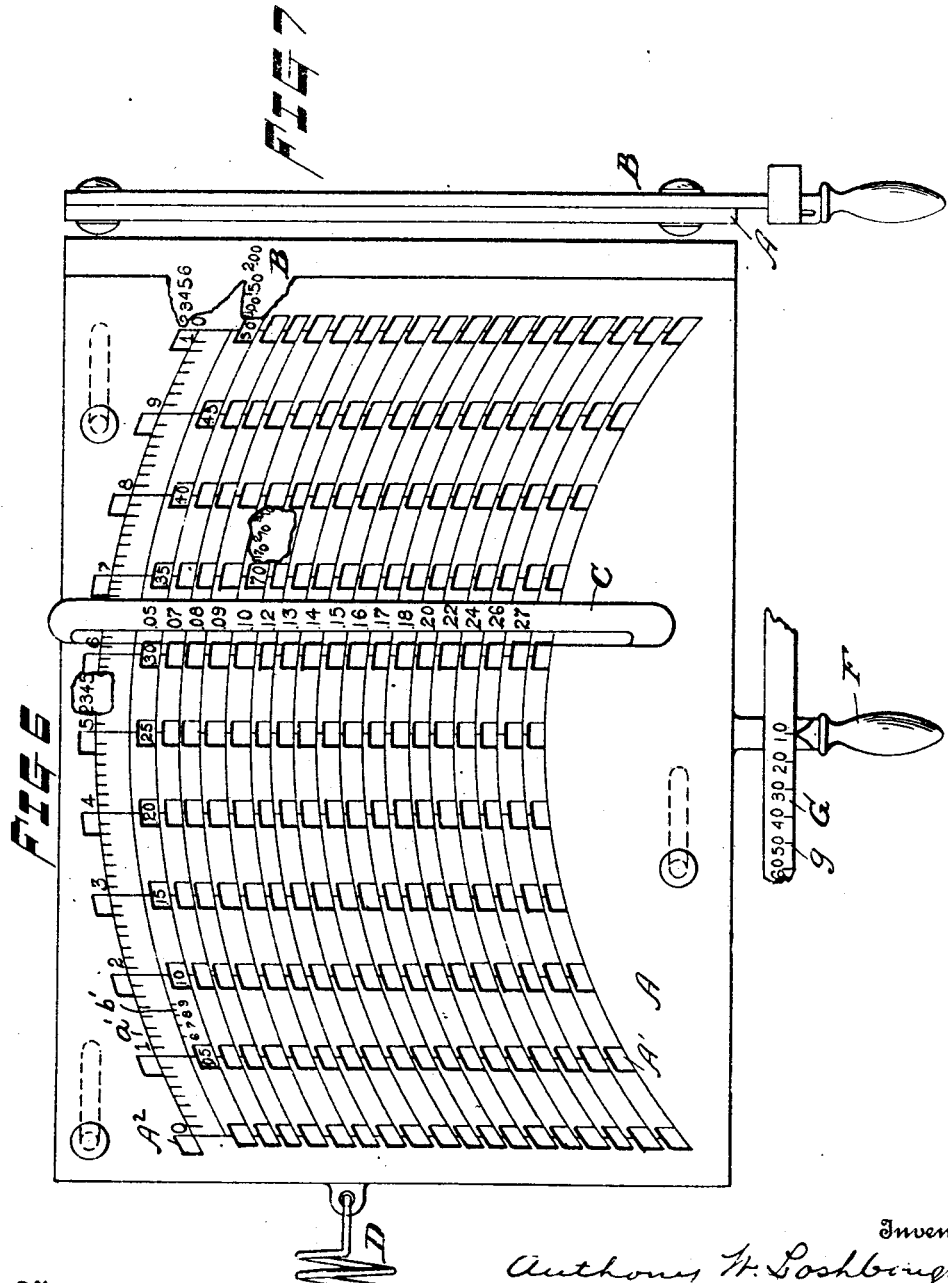
Witnesses
Grace E. Wynkoop.
Fred Bloh...
Inventor
Anthony W. Loshbough
By J. E. Thomas
Attorney A. W. LOSHBOUGH.
CHART FOR COMPUTING SCALES.
APPLICATION FILED SEPT. 14, 1910.
1,028,946.
Patented June 11, 1912.
3 SHEETS—SHEET 3.
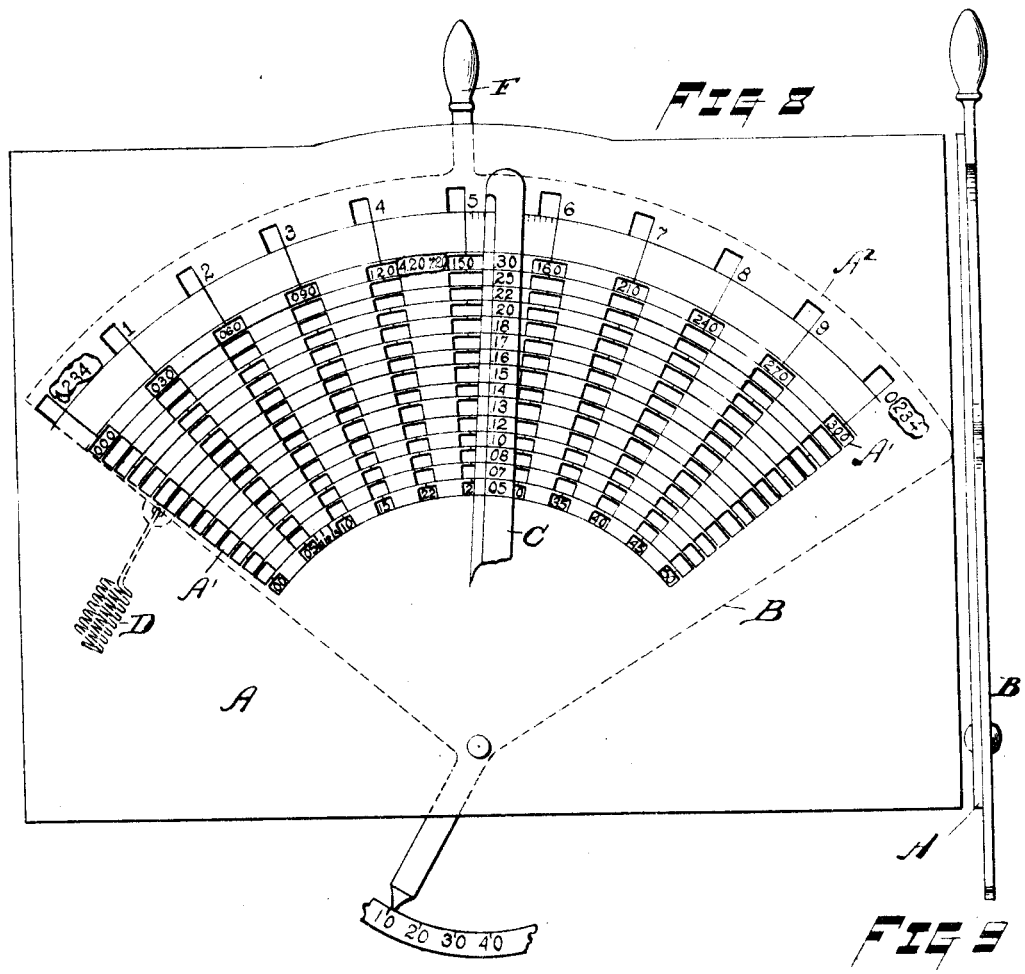
Witnesses
Grace E. Wynkoop.
Fred Blohm
Inventor
Anthony W. Loshbough
By J. E. Thomas
Attorney

UNITED STATES PATENT OFFICE.

ANTHONY W. LOSHBOUGH, OF DETROIT, MICHIGAN.

CHART FOR COMPUTING-SCALES.

1,028,946.  Specification of Letters Patent.  Patented June 11, 1912.

Application filed September 14, 1910. Serial No. 581,937.

*To all whom it may concern:*

Be it known that I, ANTHONY W. LOSHBOUGH, a citizen of the United States, residing at Detroit, county of Wayne, State of Michigan, have invented certain new and useful Improvements in Charts for Computing-Scales, and declare the following to be a full, clear, and exact description of the same, such as will enable others skilled in the art to which it pertains to make and use the same, reference being had to the accompanying drawings, which form a part of this specification.

My invention relates to an improvement in charts for computing scales, shown in the accompanying drawings and more particularly pointed out in the following specification and claims.

Charts as ordinarily constructed for computing scales are provided with a limited number of price or total value computations and ordinarily are limited to a weight capacity of about ten pounds. Now in order to determine a value above the computations indicated upon the chart, it has been necessary for the party employing the scale to work out the answer by mental operation—it being impractical to display upon the chart the great number of numerals required by a scale of larger capacity for the reason that the numerals would necessarily be so small and confused that it would be difficult to read the chart.

The object of this invention is to provide for displaying a certain series of numerals indicating the weight and money value in such manner that they may be easily read.

A further object is to provide for an increased number of computations over those ordinarily employed in charts of this character.

A further object is to provide means whereby the computations may be displayed on a horizontal line in counter-distinction to fan-shaped charts employing concentric arcs subdivided to show the computations. While my improvement may be employed in charts of this character it is well known that serious objections have been raised to the use of arc-shaped charts,—this form limiting the number of computations and necessitating the use of smaller numerals.

Other advantages and improvements will hereafter appear.

In the drawings accompanying this specification:—Figure 1 is a front elevation of a chart, showing parts broken away and a fragmentary portion of the scale frame. Fig. 2 is an end elevation of the chart. Fig. 3 is a detail sectional view on line 3—3 of Fig. 1. Fig. 4 is a detail sectional view at right angles to Fig. 3. Fig. 5 is a fragmentary perspective view of the frame and chart, showing details of construction. Fig. 6 is an elevation of a modification. Fig. 7 is an end elevation of the same. Fig. 8 is an elevation of another modification, showing the invention adapted to the commonly employed fan or sector-shaped chart. Fig. 9 is an end elevation of the same.

Referring now to the letters of reference placed upon the drawings:—A is a plate rigidly secured to the frame of the scale and provided with a series of openings A' through which numerals representing certain computations may be viewed and which are formed on a movable plate B located directly back of the apertured plate A. To the left of the plate A are a series of openings $A^2$ through which numerals placed on plate B indicating the weight, may be viewed,—there being upon the plate A, numerals from one to ten pounds, indicating the ordinary capacity of the chart. The figures displayed through the openings provide for a chart of an increased capacity.

*a* are a series of graduations adjacent to the openings $A^2$, indicating ounces or other fractions of a pound.

C is the usual indicator bar on which is displayed the price per pound, suitably connected to the platform lever (not shown),—the bar, however, forms no part of the present invention.

D indicates a spring adapted to support the movable plate B, and E in Figs. 1 and 2 indicates a plurality of weights suspended from said plate and upon the withdrawal or addition of a weight, the movable plate is adapted to present a new group of numerals in successive order through the apertures provided in plate A, due to the action of the spring D. In other words, assuming that each of the weights E has a weighing capacity of ten pounds and that ten weights in Fig. 1 are employed then the capacity of the scale is 100 pounds. Now if we remove one weight E the weighing capacity of the scale will be 20 pounds and the twenty pound capacity would be indicated by virtue of upward movement of the chart B to the extent of placing the pound mark 2 at the left of the chart back of the aperture where the numeral 1 now appears. If two weights should be removed the capacity of the scale would be increased to thirty pounds and the indication of the increased weight capacity would be indicated to the user of the scale by reason of the numeral 3 appearing back of the aperture where the numeral 1 now appears at the lower left hand side of Fig. 1.

F in Figs. 6, 7 and 8 indicates in dotted lines a handle carrying a pointer, whereby the movable plate may be manually operated if desired. The shank of the handle being also provided with a toothed portion $f$, co-acting with a spring $f'$ adapted to force it into engagement with the graduated rack bar G,—the graduations $g$ indicating the necessary adjustment required to set the movable plate so as to display the proper group of numerals for any desired weight and value. In order to provide for an increased number of computations or indications beyond what would be possible in the space provided between the apertures through which the numerals are displayed, the computations may be arranged in stepped groups, as indicated at H on the chart B,—each group occupying a space equivalent to the distance between the rows of openings in the plate A.

I indicates a stepped slotted opening in the plate B, and J is a lug or screw secured to the plate A adapted to work in the slotted way I,—the object being to secure a lateral movement of the movable plate B with respect to plate A by means of which one of the off-set groups of figures H or computations may be displayed in place of those directly in line with the openings in plate A, as shown in the drawings.

Having indicated the several parts by reference letters, the operation of the scale chart will be readily understood.

The money value of the article weighed is readily determined through the indicator bar on which the price per pound is displayed, when taken in conjunction with the weight graduations and the money value computation displayed through the series of openings in line with said weight graduations, as in the ordinary form of computing scale chart. This invention has the advantage over the usual form of chart in that the computations may be read along a horizontal line and also that the computations are separated to a relatively greater degree than has been possible on scale charts as ordinarily constructed, the present arrangement of the figures being much more legible than heretofore.

Should it become necessary to determine the money value of a commodity of relatively greater weight than may be determined on charts of say the ordinary ten pound capacity, the movable plate or chart may be actuated so as to display a new group of weight numerals and value computations to correspond therewith without confusing the face of the chart with an increased number of numerals.

In the modification shown in Fig. 6, is indicated a frame having apertures formed in the arc of a circle, through which to view the numerals placed upon the movable plate B located directly back of the frame. The plate B in this case, moves in a horizontal direction and may be manually actuated by an operating handle F provided with a pointer co-acting with a graduated member attached to the scale frame indicating the capacity of the scale in its adjusted relation. For instance in line with the top row of openings $A^2$ are numerals indicating weights from one to ten pounds with graduating marks located between each of the several openings to denote fractions of a pound. Through the several rows of apertures $A'$ are displayed value computations to correspond with the weight indications directly above seen through the apertures $A^2$;—at the price per pound denoted on the swinging indicator bar C in line with the several rows of apertures $A'$. For example, an article weighing six pounds and selling at five cents per pound (as shown on the indicator bar) will amount to a total value of thirty cents. Should the weight of the article run over six pounds and less than seven, the total weight will be indicated by the graduating marks between the apertures $A^2$, which must be added to the six pounds to determine the total weight. The total value is denoted by numerals displayed between the thirty and thirty-five cent apertures in a similar manner to the figures 6, 7, 8, and 9 indicated between the five and ten cent values in the same row.

It will be understood that while the drawings do not show graduations and numbers between all the apertures indicating penny values, the chart will be provided with the same as shown at the left of the sheet by the four graduating marks indicated at $b'$ beneath which are the numerals 6, 7, 8, and 9. If the plate B be moved one space to the left the weight numerals adjacent the openings $A^2$ would be changed ten points, that is to say, there would appear in all of the openings, with the exception of the last one, the numeral 1; and in the last opening to the right would appear the numeral 2, changing the weight capacity of the scale from the ten capacity shown to twenty pound capacity, and showing in the opening where now appears "$.05" the numerals indicating "$.55", and as the weight capacity in line with the 55 cents shows eleven pounds, it would be understood that eleven pounds of material at five cents per pound would amount to fifty-five cents. When fifty-five cents is indicated beneath the weight capacity 11 there would be displayed in line with the weight indications 10, 12, 13, 14, etc., the price indications 50, 60, 65 and 70, respectively, indicating that ten pounds at five cents a pound would amount to fifty cents and that twelve pounds at five cents per pound would amount to sixty cents, and so on. In reading the small numerals six, seven, eight, nine, indicated at $b'$ on plate A, between the apertures, just referred to, they are to be considered in connection with the number displayed through the aperture preceding them, for instance, if 55 cents should appear where 5 cents now appears, the unit numeral is dropped and we read 56—57—58—59—. Thus the money graduations are indicated at $b'$ on the member A, denoting the value of an article when the same weighs fractions of a pound. For example, we will assume that the article purchased is sold at five cents per pound and it weighs a pound and a fraction, the indicator bar C would indicate whether at five cents per pound the purchase amounted to six, seven, eight, or nine cents, or fifty-six, fifty-seven, fifty-eight, or fifty-nine cents; and likewise the graduations indicated at $a'$ on the member A, would denote the total weight through the coaction of the indicator bar C. Of course, the total weight graduations $a'$, while indicated in but eight marks, may readily be divided on imaginary lines into sixteen marks.

In the modification shown in Fig. 8, the fixed plate A is provided with a series of apertures formed on the arc of a circle. Pivoted to the plate A and direcly back of it is a fan-shaped chart B on which are placed numerals indicating the value and also a series of numerals spaced therefrom adapted to be viewed through openings in the plate to indicate the weight when the chart is set to indicate values in an increased weight capacity. In this modification the chart may be manually operated. A pointer is provided coacting with the graduated bar to indicate the changes in the capacity of the chart as in the previously described forms. It will thus be seen that I provide scales which may operate automatically or be manually operated, the accompanying drawings illustrating both types of scales.

Having thus described my invention, what I claim is:—

1. In a chart for computing scales, a movable flat or planiform chart on which is indicated a plurality of numerals denoting value computations and also a relatively increasing weight capacity, and a flat plate provided with a plurality of rows of apertures co-acting with said chart through which a predetermined and relatively limited number of said numerals may be simultaneously viewed.

2. In a chart for computing scales, a fixed frame provided with suitable apertures in rows, a movable chart located back of the fixed frame on which are displayed a plurality of numerals indicating value computations and a relatively increasing weight capacity, said numerals adapted to be viewed through the apertures in the frame, and means for actuating said movable chart whereby certain rows of numerals indicating value computations and the weight indications corresponding therewith may be displayed at the same time through the apertured frame.

3. In a chart for computing scales, a fixed frame provided with a plurality of apertures, a movable chart located back of the fixed frame on which are displayed a plurality of numerals indicating value computations in stepped groups, also numerals indicating a relatively increasing weight capacity in line therewith, means for shifting said movable chart with reference to the apertured frame whereby said numerals may be displayed in rows through the openings in the latter, and means for effecting a lateral movement of said chart whereby a row of another group of computations may be displayed in line with the corresponding weight indications.

4. In a chart for computing scales, a fixed frame provided with a series of apertures in spaced rows, a movable chart located back of the fixed frame on which are displayed a plurality of numerals indicating value computations, also numerals indicating a relatively increasing weight capacity in line therewith, a spring designed to normally support the movable chart, a plurality of removable weights suspended from said chart adapted to operate in conjunction therewith whereby upon the addition or withdrawal of one or more of said weights said chart is adapted to present another row of numerals in line with said openings in the frame, due to the action of said spring.

5. In a chart for computing scales, a fixed frame provided with a series of apertures in spaced rows, a movable chart located back of the fixed frame on which are displayed a plurality of numerals indicating value computations in stepped groups, said groups corresponding to the distance between the rows of apertures in the fixed frame, said chart also provided with numerals indicating a relatively increasing weight capacity in line with the rows of value computations, the chart being also provided with a stepped slotted opening adapted to receive a projecting pin carried by the fixed frame, the pin carried by the fixed frame, means for actuating said movable chart with reference to the fixed frame, and a graduated member adapted to indicate the adjustment necessary to present any required weight or value computations.

6. In a chart for computing scales, a fixed frame provided with a plurality of apertures in rows and a series of graduations in line therewith, a movable chart located back of the frame on which are displayed a plurality of numerals indicating value computations and a relatively increasing weight capacity, means for moving said chart in the direction of the rows of apertures in the frame, whereby a relatively greater range of computations may be successively displayed through the respective apertures in the frame.

7. In a chart for computing scales, a fixed plate provided with apertures, an adjustable chart located back of said plate on which are displayed groups of numerals in relays indicating both extended weight capacity and value computations, said chart adapted to be adjusted with respect to said apertured plate whereby certain of the respective groups or relays of numerals indicating value and weight capacity may be simultaneously brought to view.

8. In a chart for computing scales, a fixed frame provided with a plurality of rows of apertures, a movable chart located back of the fixed frame having thereon numerals indicating value and weight computations, and one or more weights co-acting with said chart whereby upon the addition or withdrawal of one or more of said weights said chart is adapted to present a different relay of numerals in line with the rows of apertures.

9. In a chart for computing scales, a flat or planiform member provided with graduations indicating intermediate weight and money values and a plurality of rows of apertures, and a movable member provided with groups of numerals co-acting with said apertured member whereby a plurality of predetermined rows of said numerals may be simultaneously displayed in successive relays.

10. In a chart for computing scales, a fixed apertured form having thereon numerals indicating weight values, one of said apertures being placed in a pre-fixed position to each of said numerals, and means for displaying to view through said pre-fixed apertures certain predetermined numerals designed to be read in conjunction with the aforesaid numerals thereby increasing the weight capacity of the said chart.

11. In a chart for computing scales, an apertured frame having thereon graduating marks indicating money values also graduating marks indicating pounds and fractions thereof and also having numerals suitably located to facilitate the enumeration of said graduating marks, said numerals and graduating marks being designed to continuously display a certain predetermined range of weight indications and the money value thereof simultaneously, and a chart of numerals co-acting with said apertured plate to display certain of its numerals through said apertures in a pre-fixed position to the numerals of said apertured plate for the purpose of increasing or decreasing the numerical indications of both weight and money value simultaneously.

In testimony whereof, I sign this specification in the presence of two witnesses.

ANTHONY W. LOSHBOUGH.

Witnesses:
SAMUEL E. THOMAS,
JAMES H. BAYNE.